United States Patent
Tsao et al.

[15] 3,660,754
[45] May 2, 1972

[54] APPARATUS FOR MEASURING CONDUCTIVITY IN A DISSIPATIVE MEDIUM WITH ELECTRICALLY SHORT PROBES

[72] Inventors: Carson K. H. Tsao, Braintree; Joseph T. De Bettencourt, West Newton, both of Mass.

[73] Assignee: Raytheon Company, Lexington, Mass.

[22] Filed: June 11, 1970

[21] Appl. No.: 48,837

Related U.S. Application Data

[63] Continuation of Ser. No. 748,814, July 30, 1968, abandoned.

[52] U.S. Cl. ................................324/5, 324/9, 324/30
[51] Int. Cl. ................................G01v 3/08, G01v 3/18
[58] Field of Search..............................324/1, 6, 9, 5, 7, 30; 343/719, 845

[56] References Cited

UNITED STATES PATENTS

| | | | |
|---|---|---|---|
| 1,652,227 | 12/1927 | Zuschlag | 324/9 X |
| 2,991,411 | 7/1961 | Freedman | 324/5 |
| 3,488,657 | 1/1970 | Pressel et al. | 343/845 X |
| 1,530,129 | 3/1925 | Loftin et al. | 343/719 |

Primary Examiner—Gerard R. Strecker
Attorney—Harold A. Murphy

[57] ABSTRACT

An apparatus for measuring conductivity in a dissipative medium with electrically short probes uses a signal source of wavelength λ. The apparatus further includes a dipole antenna probe of electrical length $l$ less than $\lambda/2$, and a transmission line. The line intercouples the dipole antenna probe to the signal source. The conductivity of the dipole as reflected back through the transmission line most nearly approximates a point measurement of conductivity in the immediate region surrounding the probe.

9 Claims, 9 Drawing Figures

APPARATUS IN DISSIPATIVE MEDIUM

APPARATUS IN DISSIPATIVE MEDIUM $$h \ll \frac{\lambda_1}{2} \qquad \lambda_2 \gg \lambda_1$$

$$l \ll \frac{\lambda_2}{2} \qquad l + h \ll \frac{\lambda_2}{2} + \frac{\lambda_1}{2}$$

INVENTORS
C. K. H. TSAO
J. T. de BETTENCOURT

ANTENNA PROBE TERMINATING TRANSMISSION LINE

COAXIAL CABLE DIPOLE ANTENNA PROBE

SALT WATER TANK FOR PROBE MEASUREMENTS

CONDUCTIVITY DEDUCED FROM INPUT CONDUCTANCE OF BARE PROBE

INVENTORS
C.K.H. TSAO
J.T. de BETTENCOURT

INVENTORS
C.K.H. TSAO
J.T. de BETTENCOURT

APPARATUS FOR MEASURING CONDUCTIVITY IN A DISSIPATIVE MEDIUM WITH ELECTRICALLY SHORT PROBES

This application is a continuation of application Ser. No. 748,814 filed July 30, 1968, now abandoned.

BACKGROUND OF THE INVENTION

This invention relates to the remote measurement of conductivity in dissipative media, and more particularly, to the measurement of conductivity in the earth in the range of less than $10^{-3}$ mhos per meter.

The exploration of the subsurface geology by measurement of the related physical parameters has found wide application in such fields as oil and gas well logging. In this regard, well logging may be defined as the recording of various physical or other properties of the earth strata penetrated by means of a bore hole and measured as a function of depth. In addition to the oil and gas exploration, bore holes are frequently made for purposes of placement of subsurface radiating antenna useful in communications. One of the important parameters for subsurface antenna placement is the determination of conductivity in the region around the antenna. There are two possible measurement techniques, that of taking measurements on the site (in situ) or bringing earth and rock samples into the lab. To bring samples into a laboratory destroys most of the on site conditions, particularly those relating to temperature, pressure, water content, and chemical composition. Furthermore, the rock which has been taken as a sample is not homogenous. Attention is thus directed to the on site method and apparatus for investigating the nature of the subterranean strata.

U.S. Pat. No. 1,652,227 issued to T. Zuschlag on Dec. 13, 1927 described a method and apparatus for measuring the resistivity as a function of frequency in a region surrounding a drill hole. In this reference, a long wire antenna was inserted into the drill hole. High frequency oscillations were impressed upon the antenna while varying frequency. The resistance characteristic of the antenna for each frequency employed was used as a basis for deducing the nature of the strata surrounding the hole. This method does not provide a reliable conductivity characteristic for each strata but at best indicated a gross effect. Significantly, measurements obtained by this method do not yield a point value. Point values are, of course, necessary to an accurate survey. In contrast to the single probe of the Zuschlag patent, U.S. Pat. No. 2,172,778 issued to W. J. Taylor, Jr. on Sept. 12, 1939 shows the use of a pair of insulated multi-electrode probes spaced apart on the earth surface for measuring DC resistance in parallel paths representing different strata at different depths between the spaced probes.

Surface resistivity measurements as shown in the Taylor patent are inadequate because it is necessary to know the depth and conductivity characteristics of each layer in order to deduce the conductivity of each layer. Surface measurements in general also yield a gross measured value. When AC measurements are taken at the surface their reliability is doubtful because of the "skin effect." The "skin effect" references the tendence of AC waves to propagate on the surface and not to penetrate into lower layers.

In the well logging art two methods of measuring resistivity are used. Either the use of a low frequency current of constant amplitude passed from one electrode in the well to another electrode or an induction log. Reference is made to the Proceedings of the Institute of Radio Engineers, Nov. 1962, pages 2227 through 2243, and more specifically, to pages 2233 through 2244.

In well logging the dissipative medium of interest has a conductivity in the range of $10^{-3}$ mhos per meter or greater. Thus, there is no incentive for the refinement of the resistivity measurement techniques for the conductivity condition approaching zero.

It is accordingly an object of this invention to devise an apparatus for the remote measurement of conductivity in dissipative media. It is a further object to devise an apparatus which is particularly useful where the conductivity range is of the order of $10^{-5}$ mhos per meter or less. It is a related object to devise an apparatus which may make on site point measurements capable of providing a more accurate indication of resistivity variations in various strata of the medium.

SUMMARY OF THE INVENTION

The foregoing objects of this invention are satisfied by the preferred embodiments comprising a signal source of wavelength $\lambda$, a dipole antenna probe whose electrical length is less than $\lambda/2$, and a transmission line intercoupling the dipole antenna probe and the signal source.

The dipole antenna probe in one embodiment has bare elements of element length $h$. It may be also fashioned to comprise a bare element of length $h$ and an insulated element length $l$. The half wavelength of the probe $l + h$ is less than $\lambda/2$. The antenna probe bare element length impedance $Z_1$ is equal to $Z_2/jkh$, where $Z_2$ is the characteristic impedance of the open circuited bare element of length $h$, and $k$ is the propagation constant.

In another embodiment the insulated dipole antenna probe has a first half length formed from a pair of spaced internal conductors surrounded by an insulation layer and an external conductor. A second half length is formed from an insulation layer and an external conductor. One internal conductor of the first half length terminates the first half length external conductor. The other internal conductor terminates the second half length external conductor. The transmission line is terminated in both of the first half length conductors.

When the probe dipole length is electrically short with respect to the applied signal wavelength, then the input conductance of the dipole probe is proportional to the conductivity of the medium surrounding the antenna. With the antenna being electrically short, that is the antenna length is less than $\lambda/2$, the termination impedance across the ends of the dipole may be assumed in open circuit. The input admittance of the open circuited line is then $$Y_1 = \frac{\tan{(h)}\, jkh}{Z_2} \approx \frac{jkh}{Z_2}$$

The use of a transmission line for determining the impedance reflected back to the line input is, of course, well known and understood according to transmission line theory.

The use of a short probe terminating a transmission line means that it can be extended any depth in, for example, a vertical bore hole to determine the resistivity or conductivity of the medium immediately surrounding the dipole probes. Consequently, both conductivity meansurments and the variations in conductivity among rock strata can be identified and mapped more accurately.

DESCRIPTION OF THE PREFERRED EMBODIMENTS

In a dissipative medium, the input conductance of either a bare or an insulated short circuited dipole is simply related to the conductivity of the medium, provided the electrical length of the dipole is short. Measurements have been made in salt water solution which verify that the conductivity may be deduced using both bare and insulated antenna probes. The technique has further been utilized to evaluate conductivity of rock media in deep drill holes.

Figure 1A:
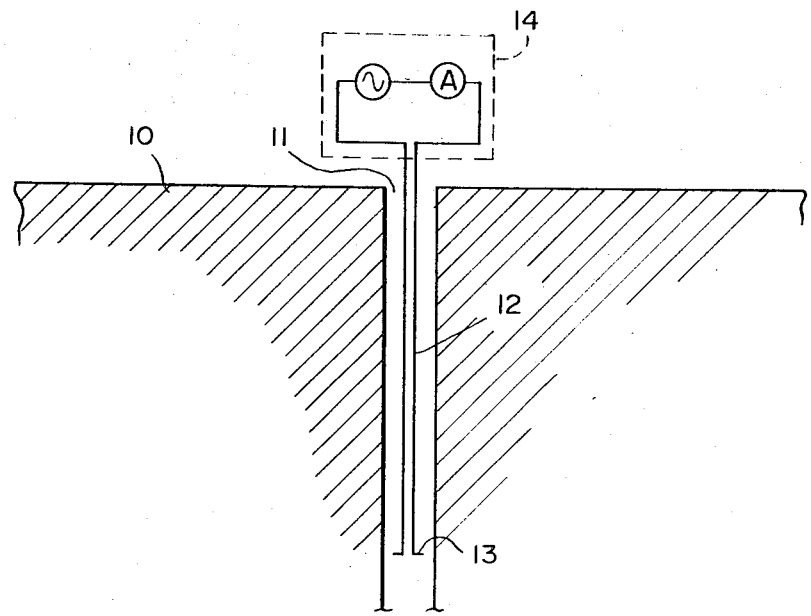
FIG. 1A shows the apparatus in a dissipative medium, such as a vertical bore hole.

In FIG. 1 the earth 10 is shown with a drill hole or bore hole 11 of indeterminant depth. An antenna probe 13 is shown connected to signal source 7 such as an AC voltage generator and a meter means 8 which may be an ammeter in series therewith through a transmission line 12.

Figure 1B:
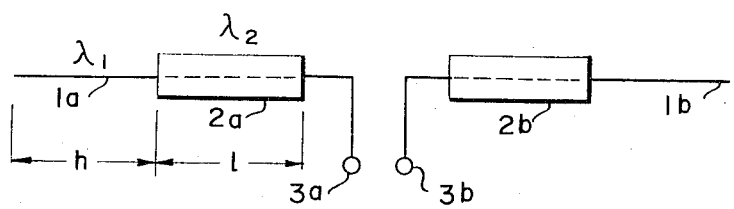
FIG. 1B is one embodiment of a dipole antenna probe partially insulated.

In FIG. 1B a partially insulated dipole antenna probe is shown. The external ends of each half element 1a and 1b are bare. The insulated dipole portions 2a and 2b are shown next to the corresponding input terminals 3a and 3b. The bare conductor 1a is $h$ units in length while the insulated conductor 2a is $l$ units in length.

In order to provide a proper foundation for the subsequent discussion, the input admittance of a bare cylindrical dipole antenna in a dissipative medium is considered. Reference is made to the book, "Antennas," by J. D. Kraus, McGraw Hill, New York, 1950. If a cylindrical dipole has a half length $h$ and a radius $a$, then the average characteristic impedance of the antenna $Z_2 = n\psi/2\pi$ and $\psi$ is equal to $2 \log_e 2 h/a - 2$. $n_0$ is the characteristic impedance of the medium surrounding the cylindrical dipole. $\psi$ is an expansion parameter accounting for the geometry of the dipole. The characteristic impedance of the medium $m$ is equal to $(\omega u)/k$ where $\omega$ is the angular frequency of the signal impressed on the antenna of the medium, $u$ is the permeability, and $k$ is the propagation constant of the medium.

As previously mentioned in the summary, if the antenna is electrically short, the termination impedance across the ends of the dipole may be assumed to be an open circuit. The input admittance of the open circuited line is then approximately $$Y_1 = \tan (h) \frac{jkh}{Z_2} \approx \frac{jkh}{Z_2}$$

FIG. 1B shows an insulated dipole of half length $l + h$. Each dipole is cylindrical and has a radius $a$. The antenna is thin, such that $l + h >> a$. In considering the effect of insulation on a dipole in FIG. 1B the electrical length $h$ and $l$ of each dipole half length must have their sum less than ½ the respective wavelength of a voltage impressed across them. Functionally, the insulation of a portion of the probe is used to alter the electrical $\lambda$ in order to probe a somewhat wider area, the end section of the probe is always uninsulated because of the necessity of preserving low impedance levels in order to be compatible with terminating transmission lines.

Figure 2A:
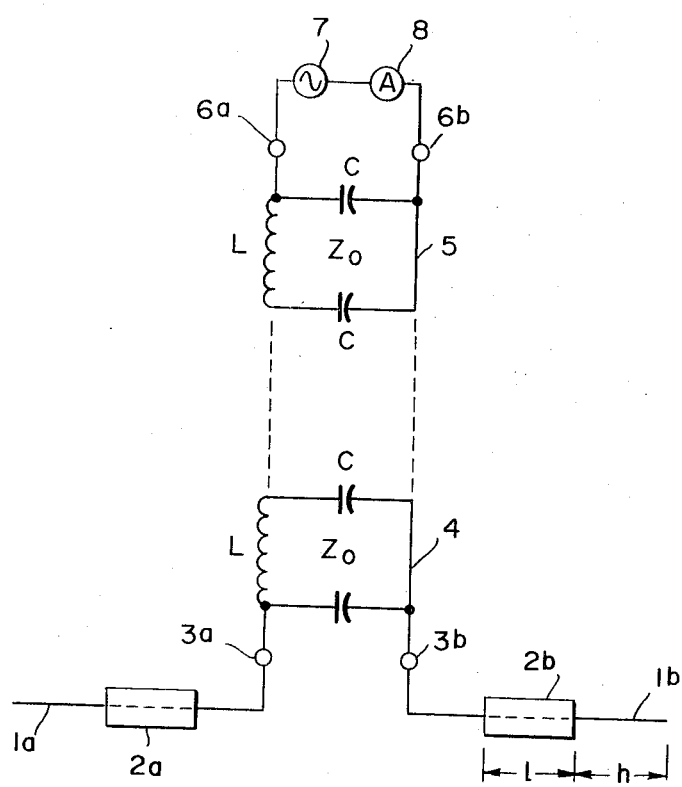
FIG. 2A shows the antenna probe terminating a transmission line.
Figure 2B:
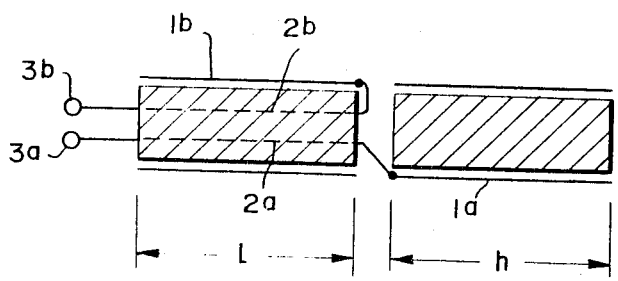
FIG. 2B shows another embodiment of the antenna probe formed from coaxial cable.

FIG. 2A shows an antenna probe which terminates a transmission line connecting the signal source and measuring means. It is clear from this figure that the transmission line is terminating in an equivalent open circuit dipole which itself may be considered as a type of complex load. A majority of the antenna probes will be used to measure conductivity in bore holes. For this reason the antenna dipoles will not be spaced outward at right angles to the transmission line connection as is suggested by FIGS. 1A and 2A. Rather, the antennas will be formed from coaxial cable section and longitudinally extend the coaxial cable in the same direction, as for example, shown in FIGS. 2B and 4A.

Figure 3A:
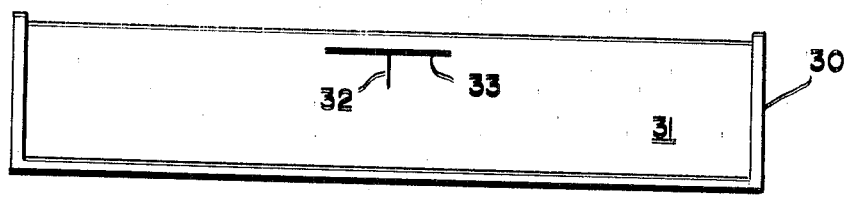
FIG. 3A illustrates the salt water tank used for probe measurements.

FIG. 3A shows a salt water tank used for probe measurements. The tank 30 was circular and made of vinyl with a diameter of 18 feet and a depth 3 feet. Each of the vinyl walls was supported by galvanized sheet steel with the bottom resting on a concrete floor. The tank had a capacity of 3,700 gallons. The desired conductivity of the water was obtained by dissolving an appropriate amount of salt in the water. The ground plane 33 was formed from a sheet of 3 foot by 3 foot aluminum plate. The plane was placed just below the surface of the salt water solution.

Monopole antenna 32 was placed on the underside of ground plane 33 and securely attached to a coaxial fitting (not shown) at the center of the plane. This fitting permitted the use of coaxial cable between the antenna and the measuring equipment. The maximum length of the antennas tested was chosen to be less than 8 inches in order to minimize the effects of the finite ground plane and the shallow depth of the tank. In this test, 400 pounds of salt was dissolved in 3,700 gallons of water. The specific gravity was measured to be 1.0,084 at water temperature of 59° F. This corresponds to a salinity of approximately 1.4 percent by volume. The solution was expected to exhibit a conductivity of 1.92 mhos per meter.

Each of the bare monopoles was made of cylindrical wires with a radius of 0.044 inches and with lengths ranging from 0.25 to 8.0 inches. The input conductances of the antennas were measured at a frequency of 200 kilohertz.

Figure 3B:
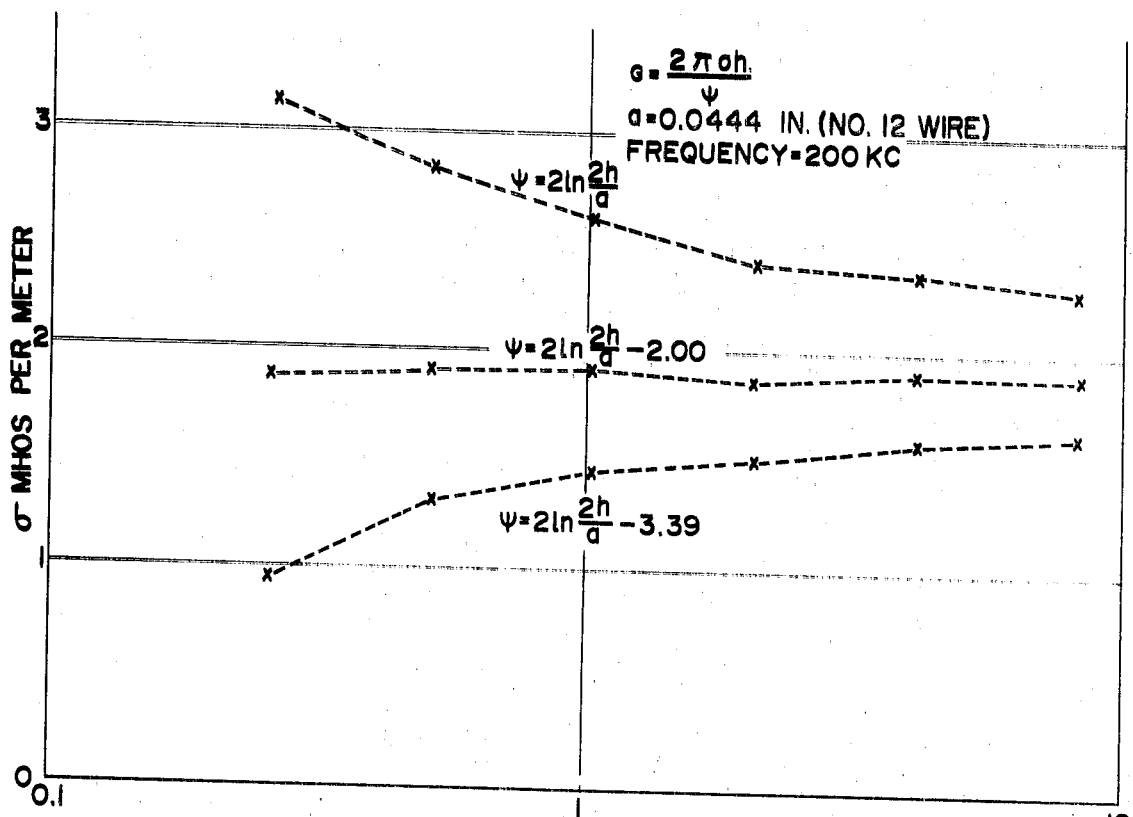
FIG. 3B is a graph representing conductivity deduced from input conductance of bare probes.

The conductivity deduced from the input conductance of a bare probe is shown in FIG. 3B. It is to be noted that the conductivity approximates or converges upon 2 mhos per meter. It may be recalled that the measured conductivity was 1.94 mhos per meter. Experimental curves also show that for the applied frequency of 200 kilohertz having a half wavelength of 750 meters that reasonably close results are obtained if the length of the monopole is between 1 to 10 inches. Each of the three curves represents a slightly different empirical approximation which is slightly inaccurate for probe lengths of less than 1 inch.

Figure 4A:
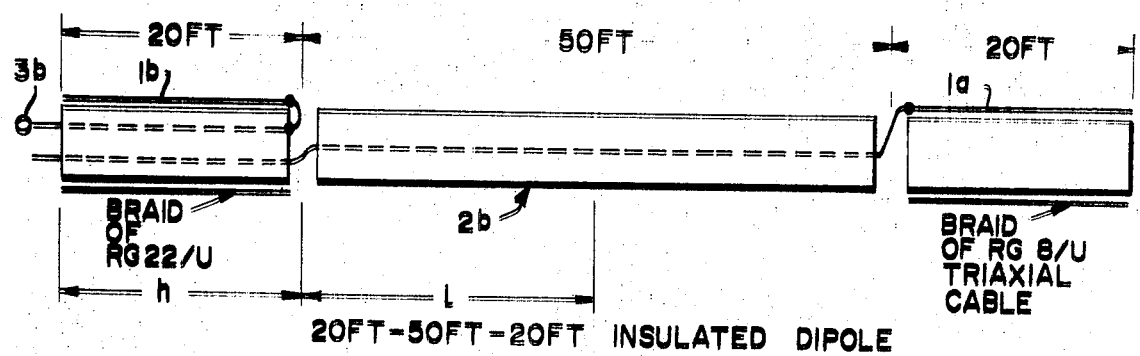
FIG. 4A shows another embodiment of a coaxial insulated antenna probe.

FIGS. 4A and 1B show insulated dipoles. For experimental purposes insulated monopoles were made of the inner elements of lengths of RG 8/U coaxial cables. The outer jacket and the braid were removed to expose the insulation. A portion of the dielectric insulation was also removed so that the remaining insulated portion had a length $l$, and the exposed inner conductor had a length $h$. Measurements were made at 200 kilohertz. The salinity of the water solution was the same as that made with the bare monopole. Measurements were made on antennas where the length $l$ varied from 1.5 to 7 inches and $h$ varied from 1 to 7 inches. The total length of the monopoles was limited to less than 8 inches. The following Table 1 represents the conductivity of the solution in mhos per meter which show a good agreement with the average value of 1.9 mhos per meter deduced from the bare antennas.

TABLE 1.—CONDUCTIVITY OF SOLUTION IN MHOS/METER

| l, inches | 1 | 1.5 | 2 | 3 | 5 | 7 |
|---|---|---|---|---|---|---|
| H, Inches: | | | | | | |
| 1 | 2.10 | 1.92 | 1.94 | 1.88 | 1.86 | 1.89 |
| 3 | 1.90 | | | 1.91 | 1.96 | |
| 5 | 1.89 | | | 1.91 | | |
| 7 | 1.80 | | | | | |

Figure 4B:
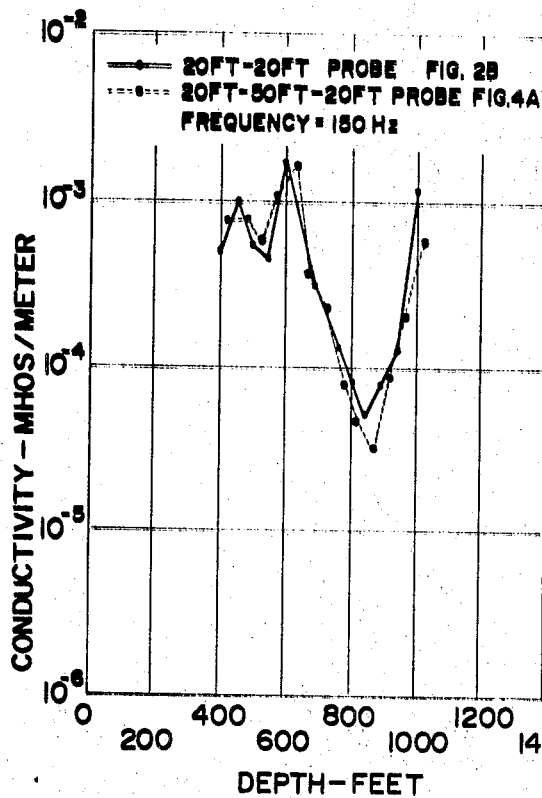
FIGS. 4B and 4C show conductivity versus depth measurements in drill holes in two distinct geographic locations obtained from the invention.
Figure 4C:
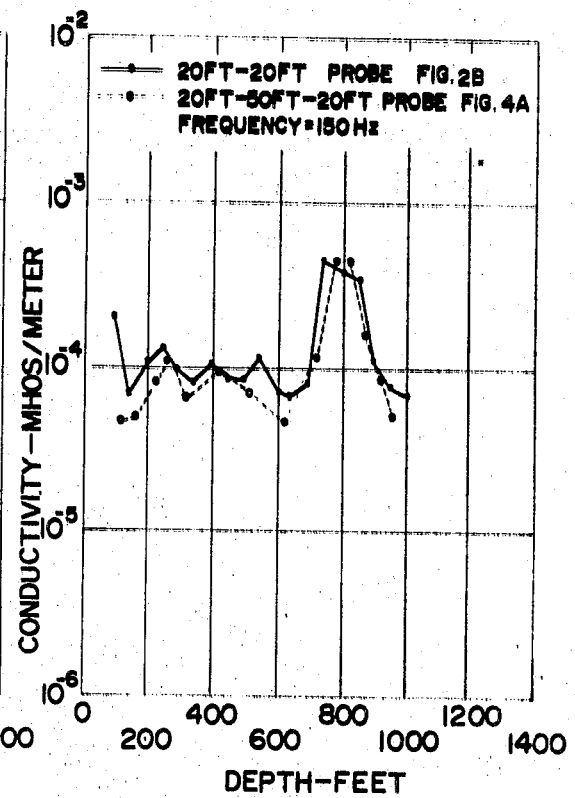

FIGS. 4B and 4C show conductivity versus depth measurements made in two different geographic locations in corresponding drill holes. There is consistent agreement between the conductivities deduced from these endeavors. In FIG. 4B a drill hole in Mineville, N.Y., the lowest conductivity encountered was $3 \times 10^{-5}$ mhos per meter. In FIG. 4C a measurement made at Saranac Lake, N.Y. showed a pronounced region of high conductivity at about 800 feet in depth.

Both the probe shown in FIG. 1B and that shown in FIG. 4A were used. There is modestly good agreement between the two conductivity profiles obtained using respective probes.

FIG. 4A shows a probe formed from a first length having a pair of spaced internal conductors surrounded by an insulation layer and an external conductor 1b. A second length positioned longitudinally after the first length has a single conductor surrounded by an insulation layer. A third length positioned after the second length includes an insulation layer surrounded by an external conductor. One conductor of the first length is terminated in the first length external conductor 1b. The other internal conductor is terminated in the second length conductor. The second length conductor, in turn, is terminated in the third length external conductor 1a.

The first length is $h$ units and is preferably made from RG 22/U coaxial cable. The second length is $2l$ units long and is formed from RG 8/U coaxial cable with the outer insulation and external braid removed. The third length is also formed from RG8/U triaxial cable with the internal insulation and external braid in tact and the internal conductor removed.

In summary, it has been shown that in a dissipative medium the input conductance of either a bare or an insulated dipole antenna or monopole antenna is simply related to the conductivity of the medium provided that the electrical length of the dipole or monopole is short. The conductivity of the dipole as reflected back through a transmission line most nearly approximates a point measurement of conductivity in the immediate region surrounding the probe.

What is claimed is:

1. Apparatus for the measurement of conductivity in a dissipative medium comprising:
   a signal source of wavelength $\lambda$;
   a dipole antenna probe having an admittance at the frequency $1/\lambda$ which is the measurement of the conductivity of a region of said dissipative medium remote from said probe, said probe being coupled to said source for placement in the dissipative medium to a predetermined depth, said probe having one pole of electrically infinitesimal length terminated in the ground plane and having the other pole of electrical length L; and
   means coupled to the antenna probe at the input end thereof for measuring the input admittance of the probe at the frequency $1/\lambda$, where $(\lambda)/(2)>L$ and wherein the bare element length admittance of said antenna probe is approximately equal to the product of the characteristic admittance of the open circuited bare element length and the propagation constant of said medium.

2. Well logging apparatus for use in a dissipative medium comprising:
   a signal source of wavelength $\lambda$;
   an antenna probe coupled to said signal source for placement in the dissipative medium to a predetermined depth, said probe having one pole of electrical length less than $\lambda/2$ terminated in the ground plane and having the other pole of electrical length L said length L being proportional to $(k\lambda)/2$ with $k$ chosen such that the conductivity of said dipole as reflected back through a transmission line is approximately a point measurement of conductivity of said dissipative medium in the immediate region surrounding said antenna probe; and
   means coupled to said antenna probe for measuring the electrical characteristics of said dissipative medium.

3. Well logging apparatus in accordance with claim 2, wherein said antenna probe is a nonresident dipole and said electrical characteristic measured is the conductivity of said dissipative medium.

4. Well logging apparatus in accordance with claim 3, wherein said means for measuring the conductivity of said dissipative medium includes means coupled to said nonresident dipole at the input end thereof for measuring the input admittance of said nonresident dipole at the frequency $1/\lambda$, where $(\lambda)/(2)>L$.

5. Apparatus for the remote measurement of conductivity in a dissipative medium comprising:
   a signal source of wavelength $\lambda$;
   a dipole antenna probe coupled to said source for placement in the dissipative medium to a predetermined depth; and
   means coupled to said antenna probe at the input end thereof for measuring the input admittance of the probe at frequency $1/\lambda$; said probe having a bare element length $h$ and an insulated element length $l$ and whose half length being $l + h < (\lambda)/(2)$, said antenna probe bare element length admittance $Y_1$ being approximately equal to $jkhY_2$, where $Y_2$ is the characteristic admittance of the open circuited bare element length $h$, $k$ being the propagation constant and $j$ being the $\sqrt{-1}$.

6. Apparatus for the measurement of conductivity in a dissipative medium comprising:
   a signal source of wavelength $\lambda$;
   a dipole antenna probe coupled to said source for placement in a dissipative medium to a predetermined depth; and
   means coupled to said antenna probe at the input end thereof for measuring the input admittance of the probe at the frequency $1/\lambda$, the probe having a bare element length $h$ cross-section radius A and an insulated element length $l$, the dipole antenna half length $l+h<(\lambda)/(2)$, the antenna probe bare element length admittance $Y_1$ being equal to $$\frac{\pi h (p + j\omega e_o e_r)}{\log \frac{2(l+h)}{A}}$$

where $p$ is conductivity in mhos per meter of the surrounding dissipative medium, $e_o$ is the free space dielectric constant, and $e_r$ is the relative dielectric constant.

7. Apparatus for the measurement of conductivity in a surrounding dissipative medium comprising:
   a signal source of wavelength $\lambda$;
   an insulated dipole antenna probe coupled to said source for placement in the dissipative medium to a predetermined depth; and
   means coupled to said antenna probe at the input end thereof for measuring the input admittance of the probe at frequency $1/\lambda$; the probe having a half length less than $\lambda/2$ and further being formed from a first half length having a pair of spaced internal conductors surrounded by an insulation layer and an external conductor, and a second half length having an insulation layer and an external conductor, one internal conductor of the first half length terminating the first half length external conductor, the other internal conductor terminating the second half length external conductor.

8. Apparatus according to claim 7, wherein the means coupling the antenna probe are coupled to the spaced internal conductors of the dipole antenna probe.

9. Apparatus for the measurement of conductivity in a surrounding dissipative medium comprising:
   a signal source of wavelength $\lambda$;
   an insulated dipole antenna probe coupled to said source for placement in the dissipative medium to a predetermined depth; and
   means coupled to the probe at the input end thereof for measuring the input admittance of the probe at the frequency $1/\lambda$, the antenna probe having a half length of less than $\lambda/2$ and further being formed from:
     a first layer having a pair of spaced internal conductors surrounded by an insulation layer and an external conductor;
     a second layer having a single conductor surrounded by an insulation layer;
     a third layer having an physical layer and an external conductor; and
     one conductor of the first layer being terminated in the first layer external conductor, the other internal conductor being terminated in the second layer conductor, the second layer conductor being terminated in the third layer external conductor.

* * * * *

UNITED STATES PATENT OFFICE
CERTIFICATE OF CORRECTION

Patent No. 3,660,754　　　　　　　Dated May 2, 1972

Inventor(s) Carson K.H. Tsao and Joseph T. deBettencourt

It is certified that error appears in the above-identified patent and that said Letters Patent are hereby corrected as shown below:

Column 4, line 50, change "1", first occurrence to -- $c$ --.

Column 4, line 51, change "H" to -- $h$ --.

Column 6, line 15, Claim 6, after "$h$" insert -- of --.

Column 6, line 63, Claim 9, change "physical" to -- insulation --.

Signed and sealed this 27th day of March 1973.

(SEAL)
Attest:

EDWARD M. FLETCHER, JR.　　　　　ROBERT GOTTSCHALK
Attesting Officer　　　　　　　　　Commissioner of Patents